(12) United States Patent
Stauffer et al.

(10) Patent No.: US 9,361,639 B2
(45) Date of Patent: Jun. 7, 2016

(54) VIDEO MESSAGE CAPTURE AND DELIVERY FOR ONLINE PURCHASES

(71) Applicant: Disney Enterprises, Inc., Burbank, CA (US)

(72) Inventors: Brian Stauffer, Pasadena, CA (US); Patricia Elaine Colley, Portland, OR (US); Kimberly J. Cullen, San Francisco, CA (US); Jesse James Garrett, San Francisco, CA (US); Peter David Merholz, Oakland, CA (US); Dane Robert Petersen, Berkeley, CA (US); Margaret Ann Shear, Brooklyn, NY (US); Kristin Anne Miller, Tiburon, CA (US); Jonathan Hunt Warner, Oakland, CA (US); Christopher Adam Wronski, San Francisco, CA (US)

(73) Assignee: Disney Enterprises, Inc., Burbank, CA (US)

( * ) Notice: Subject to any disclaimer, the term of this patent is extended or adjusted under 35 U.S.C. 154(b) by 216 days.

(21) Appl. No.: 13/626,514

(22) Filed: Sep. 25, 2012

(65) Prior Publication Data

US 2014/0089128 A1 Mar. 27, 2014

(51) Int. Cl.
| | |
|---|---|
| *G06Q 30/00* | (2012.01) |
| *G06Q 30/06* | (2012.01) |
| *G06F 3/00* | (2006.01) |
| *H04N 9/87* | (2006.01) |
| *H04N 21/478* | (2011.01) |
| *H04N 21/4788* | (2011.01) |

(52) U.S. Cl.
CPC ............ *G06Q 30/0621* (2013.01); *G06F 3/005* (2013.01); *H04N 9/87* (2013.01); *H04N 21/4788* (2013.01); *H04N 21/47815* (2013.01)

(58) Field of Classification Search
CPC ....................................... G06Q 30/0601–30/08
USPC ................................................. 705/26.1–27.2
See application file for complete search history.

(56) References Cited

U.S. PATENT DOCUMENTS

| | | | |
|---|---|---|---|
| 2009/0240593 A1* | 9/2009 | Kelly et al. ..................... 705/26 |
| 2012/0271732 A1* | 10/2012 | Glass et al. .................. 705/26.5 |
| 2013/0226728 A1* | 8/2013 | Oghittu ......................... 705/26.5 |
| 2013/0282514 A1* | 10/2013 | Dougherty et al. .......... 705/26.5 |
| 2013/0346337 A1* | 12/2013 | O'Donnell et al. ........... 705/333 |
| 2014/0207628 A1* | 7/2014 | Erez et al. .................... 705/27.1 |

OTHER PUBLICATIONS

Excite@Home's BlueMountain.com Brings Online Greetings and Gifts Together, Dec. 4, 2000, PR Newswire Association LLC., Journal 4PRN, p. 9603.*

* cited by examiner

*Primary Examiner* — Ethan D Civan
*Assistant Examiner* — Brittney N Miller
(74) *Attorney, Agent, or Firm* — Patterson + Sheridan LLP (57) ABSTRACT

Techniques for delivering a video message from a purchaser of an order to a recipient of the order are described. An order for one or more items is received, the order specifying a recipient and having an association with a purchaser. The order further specifies to deliver a video message from the purchaser to the recipient. Embodiments receive a video message from the purchaser. The order for the one or more items is fulfilled. Embodiments transmit at least an indication of the video message to the recipient.

30 Claims, 6 Drawing Sheets

VIDEO MESSAGE CAPTURE AND DELIVERY FOR ONLINE PURCHASES

BACKGROUND

1. Field of the Invention

Embodiments generally relate to online retail, and more particularly, to techniques for transmitting a video message from an online purchaser to a recipient of an online gift purchase.

2. Description of the Related Art

With the proliferation of the Internet, more and more consumers are purchasing items online. In online financial transactions, buyers search for and purchase products and services through electronic communications with online sellers over electronic networks, such as the Internet. During the course of these transactions, buyers may provide payment in various ways including, for example, credit cards, electronic fund transfers, and other payment techniques offered by online payment providers.

Typically, when shopping online at a particular seller's website, buyers select items to purchase by clicking on a link for a specific item, and the selected items are placed on reserve in some type of virtual shopping cart while the buyer continues to browse the particular seller's website. The virtual shopping cart typically allows buyers to add or delete products, specify attributes, such as color, quantity, size, and the like, and purchase products contained within the cart. When a buyer changes or updates data in the virtual shopping cart, e.g., the color or quantity of an item, the updated data is sent to a server and a response is reported through a reload of the seller's webpage. If more updated data is sent as part of an order, the webpage may reload or refresh again.

SUMMARY

Embodiments provide a method, system and non-transitory computer-readable medium for receiving an online order for one or more items. Here, the online order is made by a requester and specifies a recipient. Additionally, the online order further includes a request to deliver a personalized video message from the requester to the recipient. The method, system and non-transitory computer-readable medium include receiving the personalized video message from the requester, the video message being distinct from the one or more items. The method, system and non-transitory computer-readable medium also include fulfilling the online order for the one or more items. Further, the method, system and non-transitory computer-readable medium include transmitting at least an indication of the video message to the recipient in a manner that conveys an association with the one or more items.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Although some shopping websites provide a mechanism through which purchasers can include a message for their recipients, these mechanisms are limited to textual messages. For instance, an online store could allow users to input a short textual message to the recipient and could include this textual message when delivering the purchased item(s) to the recipient. As an example, in a transaction involving physical goods, the textual message could be printed on a gift card and the card could be included in the delivery packaging for the physical goods (e.g., in a box the physical goods are shipped in). As another example, in a transaction involving digital goods (e.g., an online game purchase), a digital message specifying the textual message could be included with the delivery of the digital goods (e.g., in an email informing the recipient that he has received a digital gift). While these techniques allow purchasers some degree of personalization for their online gift purchases, as a personalized message may be delivered together with the purchased goods, such personalization is limited due to the textual nature of the message.

As such, embodiments provide techniques for delivering a video message from a purchaser to a recipient of an online order. In one embodiment, an online store server is configured with a video capture and delivery (VCD) component. The VCD component could receive an online order for one or more items and specifying a recipient. Generally, the online order is associated with a purchaser (e.g., the user or entity that initiated the online order). Additionally, the online order may further include a request to deliver a video message from the purchaser to the recipient of the order. For example, the interface for the online store could enable the purchaser to record a video message (e.g., using a webcam on a client system associated with the purchaser) during the checkout process for the online order. As another example, the interface could enable the purchaser to upload a prerecorded video message during the checkout process.

The VCD component could then receive the video message from the purchaser and could initiate the process of fulfilling the online order for the one or more items specified in the order. For instance, in a transaction involving digital goods, the VCD component could initiate a process for delivering the digital goods to the recipient, in which the recipient is notified of the online gift and allowed to download the digital goods from a server. As another example, in a transaction involving physical goods, the VCD component could initiate a process for delivering the physical goods to the recipient, in which the physical goods are packaged into a shipping container and are transported (e.g., by a freight service) to the recipient.

Additionally, the VCD component could transmit the video message (or an indication of the video message) to the recipient. For example, the VCD component could include the video message (or a reference to the video message, such as a URL) in an electronic message (e.g., an email message) transmitted to the recipient. Advantageously, doing so enables the purchaser to record a more personalized video message that is then delivered to the recipient along with the purchased items, thereby creating an improved system for online shopping and gift delivery.

Figure 1:
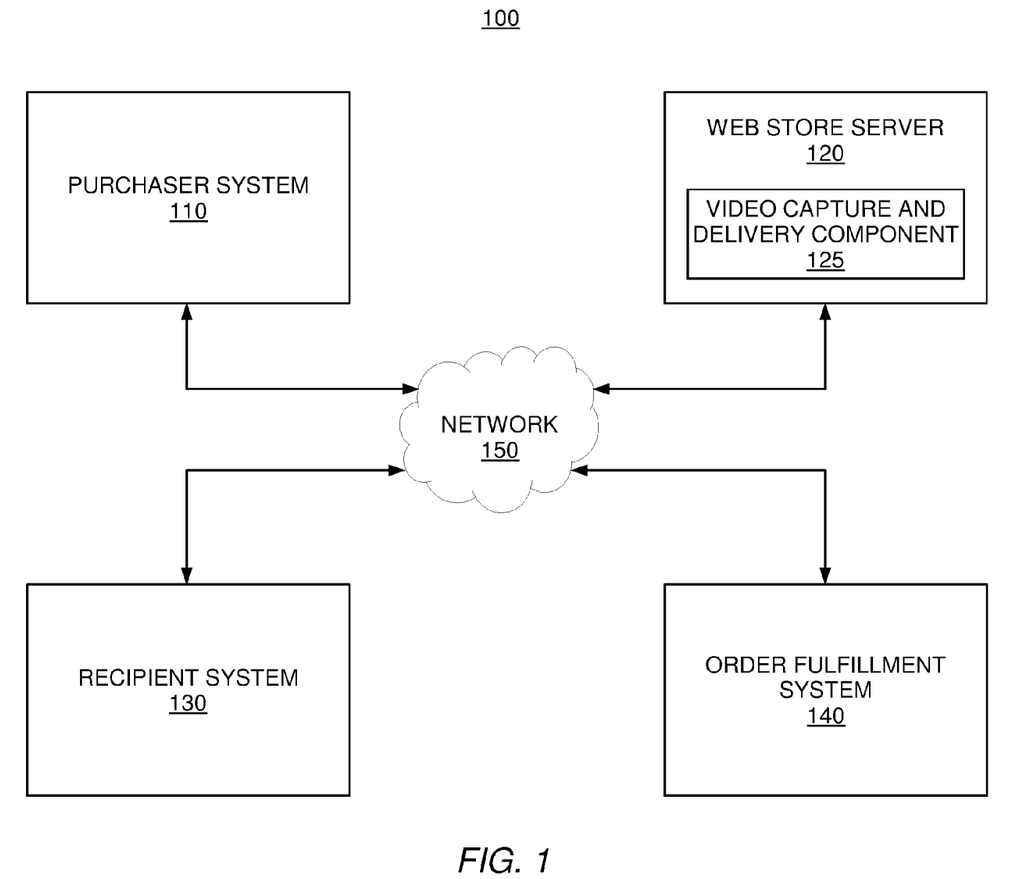
FIG. 1 is a block diagram illustrating a system configured with a video capture and delivery component, according to one embodiment described herein.

FIG. 1 is a block diagram illustrating a system configured with a video capture and delivery component, according to one embodiment described herein. As shown, the system 100 includes a purchaser system 110, a web store server 120, a recipient system 130 and an order fulfillment system 140. The web store server 120 is configured with a VCD component 125. As discussed above, the VCD component 125 may be configured to manage the delivery of a video message from a purchaser to a recipient of an online order. In the depicted system 100, a purchaser could place an order using a client application (e.g., a web browser running on the purchaser system 110) from the web store (e.g., a web application hosted by a web server application on the web store server 120). The order may specify one or more items and recipient information.

Additionally, the online order may further include a request to deliver a video message from the purchaser to the recipient of the order. For example, the interface for the online store could enable the purchaser to record a video message (e.g., using a webcam on the purchaser system 110) during the checkout process for the online order. As another example, the interface could enable the purchaser to upload a prerecorded video message from the purchaser system 110 to the web store server 120 during the checkout process.

In any event, the VCD component 125 could receive the video message from the purchaser system 110 and could initiate the process of fulfilling the online order for the one or more items specified in the order. For instance, the VCD component 125 could transmit a request to the order fulfillment system 140 specifying the goods and the recipient information associated with the order. Software on the order fulfillment system 140 could then manage the delivery of the specified goods to the recipient. For example, in a transaction involving digital goods, software on the order fulfillment system could notify the recipient of the online gift and provide a mechanism through which the recipient can download the digital goods. As another example, in a transaction involving physical goods, software on the order fulfillment system could generate an order and transmit the order to a warehouse for processing.

Additionally, the VCD component 125 is configured to manage the delivery of the video message to the recipient. For example, the VCD component 125 could include the video message (or a reference to the video message, such as a URL) in an electronic message (e.g., an email message) transmitted to the recipient. As another example, in a transaction involving physical goods, the VCD component 125 transmit a request to the order fulfillment system 140 to include a URL associated with the video message in the delivery packaging for the goods. For instance, the URL could be specified on a printout (e.g., a printed piece of paper) specifying the URL at which the video message can be accessed. As an example, the VCD component 125 could generate a printout (e.g., by transmitting printout data to a printer device) specifying the URL at which the video message can be accessed. Such a printout could specify, for instance, an alphanumeric string of characters specifying the URL, a QR code which the user can scan (e.g., using a QR code application on a mobile device) to access the URL, and so on. The recipient could then enter the URL into the recipient system (e.g., into a web browser running on the recipient system 130) in order to access the video message. As another example, a memory device (e.g., a USB flash memory device) containing a link to the URL could be included in the packaging with the physical goods. The recipient could then insert the memory device into the recipient system 130 and could use the URL to access the video message.

As another example, the VCD component 125 could insert the video message itself onto a memory included in the delivery packaging. For instance, if the items purchased for the recipient include a memory (e.g., a computing system), the VCD component could transfer the video message onto the memory and could create a link (e.g., on the desktop of the computing system) to the video message. As another example, the video message could be loaded on to a memory device (e.g., a USB flash memory device) which is included in the delivery package. In one embodiment, the delivery packaging itself may include a display device capable of displaying the recorded video message. Such a display device could be, for instance, part of the delivery packing itself (e.g., a box including at least one display panel) or part of a standalone unit (e.g., a handheld video game system) coupled to the packaging. Responsive to a user action (e.g., the recipient pressing a power button on the display), logic (e.g., on a memory coupled to the display and storing the video message) could begin playback of the video message. In one embodiment, the playback could begin responsive to the logic authenticating the recipient, based on the recipient swiping his finger across a fingerprint scanner on the delivery packaging. Advantageously, doing so enables the purchaser to record a more personalized video message that is then delivered to the recipient along with the purchased items, thereby creating an improved system for online shopping and gift delivery.

In one embodiment, the VCD component 125 is configured to provide an interface for editing the video message. For example, once the purchaser records or uploads the video message to the web store server 120, the VCD component 125 could allow the purchaser to edit the message. That is, the VCD component 125 may make alterations to the received video message based on one or more interactions between the purchaser and the provided interface. For instance, the VCD component 125 could enable the purchaser to delete certain portions of the video message using the editing interface.

Additionally, the VCD component 125 could allow the purchaser to alter the background of the received video message. For instance, although the purchaser may have recorded the video message in his home office, the purchaser could use an interface of the VCD component 125 to alter the background of the video message so that it appears the purchaser is at one of the Disney® theme parks. Moreover, the background could be animated. For instance, the background could altered so that the purchaser appears to be at a Disney® theme park during a fireworks show. The VCD component 125 could also allow the purchaser to alter the video message by inserting one or more animated characters into the video message. For instance, the VCD component 125 could alter frames of the video message, so that it appears that an animated virtual character (e.g., Mickey Mouse®) is standing next to the user in the video message. As yet another example, the VCD component 125 could alter the video message by applying one or more effects to the video message. Continuing the above example of a background showing a Disney® theme park during a fireworks show, lighting effects could be applied to the purchaser in the video message, such that it appears the fireworks are casting light down on the purchaser.

In addition to altering the visual appearance of the video message, the VCD component 125 could be configured to alter the sound track of the video message. As an example, the VCD component 125 could be configured to augment the purchaser's voice in the video message, so that the user sounds like a famous character (e.g., Mickey Mouse®). As another example, the VCD component 125 could alter the video message to include background music or sound effects. For instance, where the VCD component 125 has augmented the background of the video message to show a theme park during a fireworks display, the VCD component 125 could also alter the audio track of the video message to include the sound of fireworks in sync with the depicted fireworks display.

In one embodiment, the VCD component 125 is configured to restrict access to the video message. For instance, the VCD component 125 could associate a first access key with the video message and could provide an interface for providing access to the video message. For example, the video message could be hosted on a web server and accessible at a particular URL. However, the web server could require that users enter a certain password before viewing the video message. In such an embodiment, the VCD component 125 may be configured to transmit the password to the recipient of the online order associated with the video message. For instance, the VCD component 125 could transmit an electronic message specifying the password to the recipient. As another example, the VCD component 125 could include a printed piece of paper specifying the password in the delivery packaging for the ordered item(s). In a particular embodiment, the VCD component 125 is configured to transmit a first message (e.g., an email message) notifying the recipient than an order has been placed that includes a video message for the recipient. However, the VCD component 125 may not provide the recipient with the password for accessing the video message until the order arrives (e.g., the password could be included in the delivery packaging for the order). Doing so may be advantageous, for instance, when the purchased items are a surprise gift and the purchaser wishes to avoid spoiling the surprise by allowing the recipient to see the video message before the purchased items are delivered.

In a particular embodiment, the VCD component 125 is configured to begin the playback of the video message responsive to recognizing the gifted items. For example, an augmented reality application running on the recipient's mobile device could be preconfigured with data characterizing the visual appearance of a gifted item (e.g., a Mickey Mouse® toy). The augmented reality application could then use this data to determine when the gifted item is placed in front of one or more cameras. For instance, where the augmented reality application is running on a handheld device (i.e., an augmented reality device), a camera of the handheld device could capture images of the physical environment, and the recipient could view the images using a display of the handheld device. As another example, an application running on a personal computing system could capture images using a webcam coupled to the computing system. Upon determining that the gifted item is contained within one of the images, the VCD component 125 could begin playback of the video message. For instance, when the user holds the gifted item in front of the webcam, the VCD component 125 could begin streaming the video message associated with the gifted item. As another example, when the user views the gifted item using the augmented reality device, the VCD component 125 could begin playback of the video message. In such an example, the VCD component 125 could be configured to augment the images displayed on the augmented reality device, so that the video message appears to play within the depicted physical environment. For instance, the purchaser could appear in the displayed frames as a holographic character standing within the physical environment. Advantageously, doing so provides a fun and intuitive way for purchasers to begin the playback of the video message associated with their gift.

Figure 2:
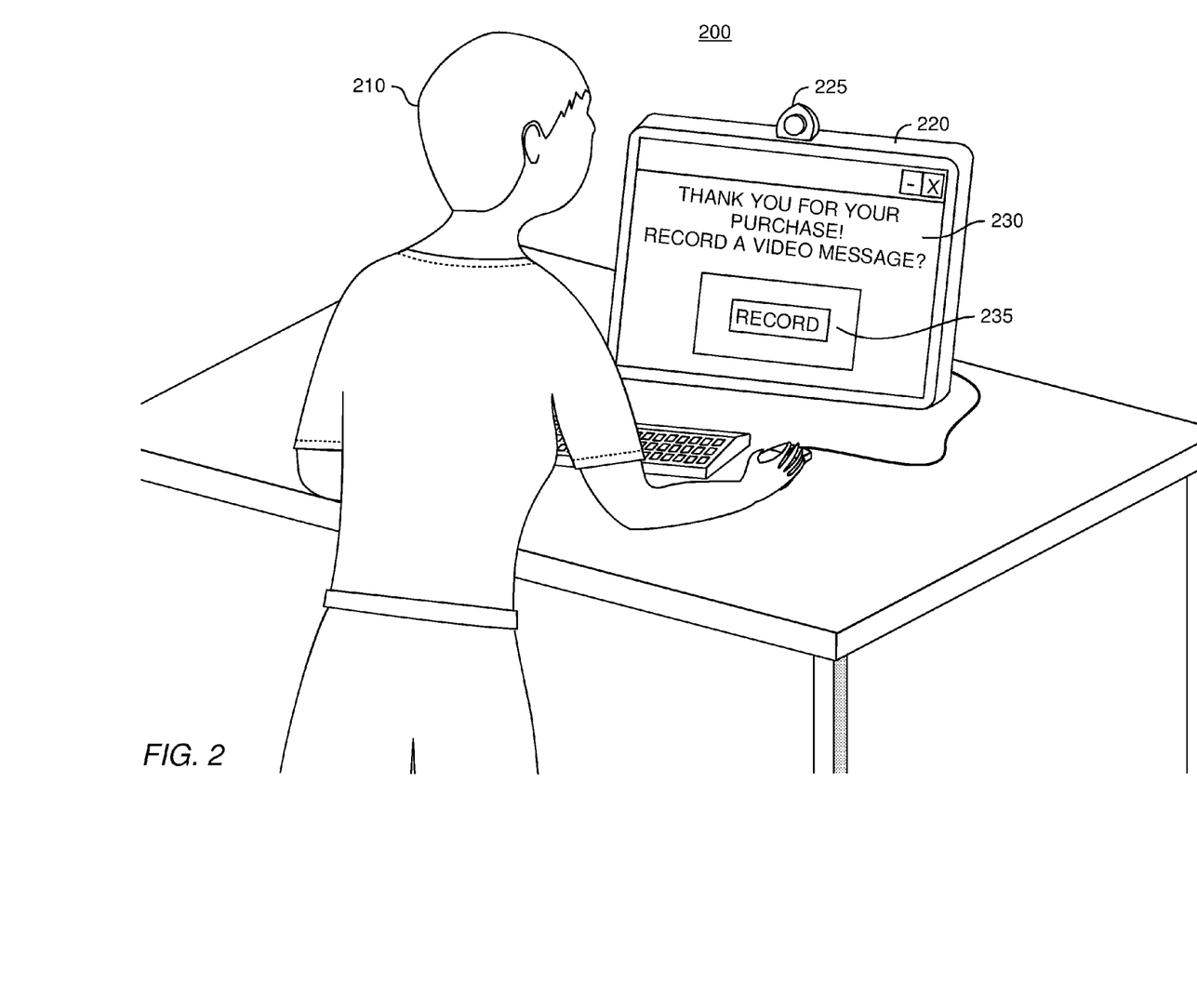
FIG. 2 depicts a user completing an online purchase on a system configured with a video capture and delivery component, according to one embodiment described herein.

FIG. 2 depicts a user completing an online purchase on a system configured with a video capture and delivery component, according to one embodiment described herein. As shown, the illustration 200 includes a purchaser 210 interacting with a purchaser system 220. The purchaser system 220 is configured with a web cam 225. Additionally, the purchaser system 220 shows an interface 230 for a VCD component 125. In one embodiment, the interface 230 is rendered by a web browser based on one or more web pages. Here, the interface 230 includes a record button 235, which the purchaser 210 may interact with to record a video message during an online order. For example, in response to the purchaser 210 clicking on the record button 235, the VCD component 125 could be configured to display a second interface screen through which the purchaser 210 can record a video message using the web cam 225. As discussed above, in one embodiment, the VCD component 125 is configured to allow the purchaser 210 to upload a video message using the purchaser system 220.

Although examples are described throughout this document that relate to purchases made at an online store, it is contemplated that embodiments of the present invention may be configured to work with other retail environments as well. In one embodiment, the purchaser system 220 may be a system (or kiosk) located at a retail store or other retail location where a gift is being purchased (e.g., a booth at a Disney® theme park). In such an embodiment, the system could be equipped with a video camera and software to record a video message. The system could also be configured with software configured to edit or otherwise alter the recorded video message. For instance, as discussed above, the software could alter the background scenery of the video message so that it appears the user is at national attraction (e.g., in front of the Eiffel tower), rather than in a crowded retail store. The VCD component 125 could then receive the recorded video message and deliver the recorded video message (or a reference to it, such as a URL) to the recipient.

Figure 3:
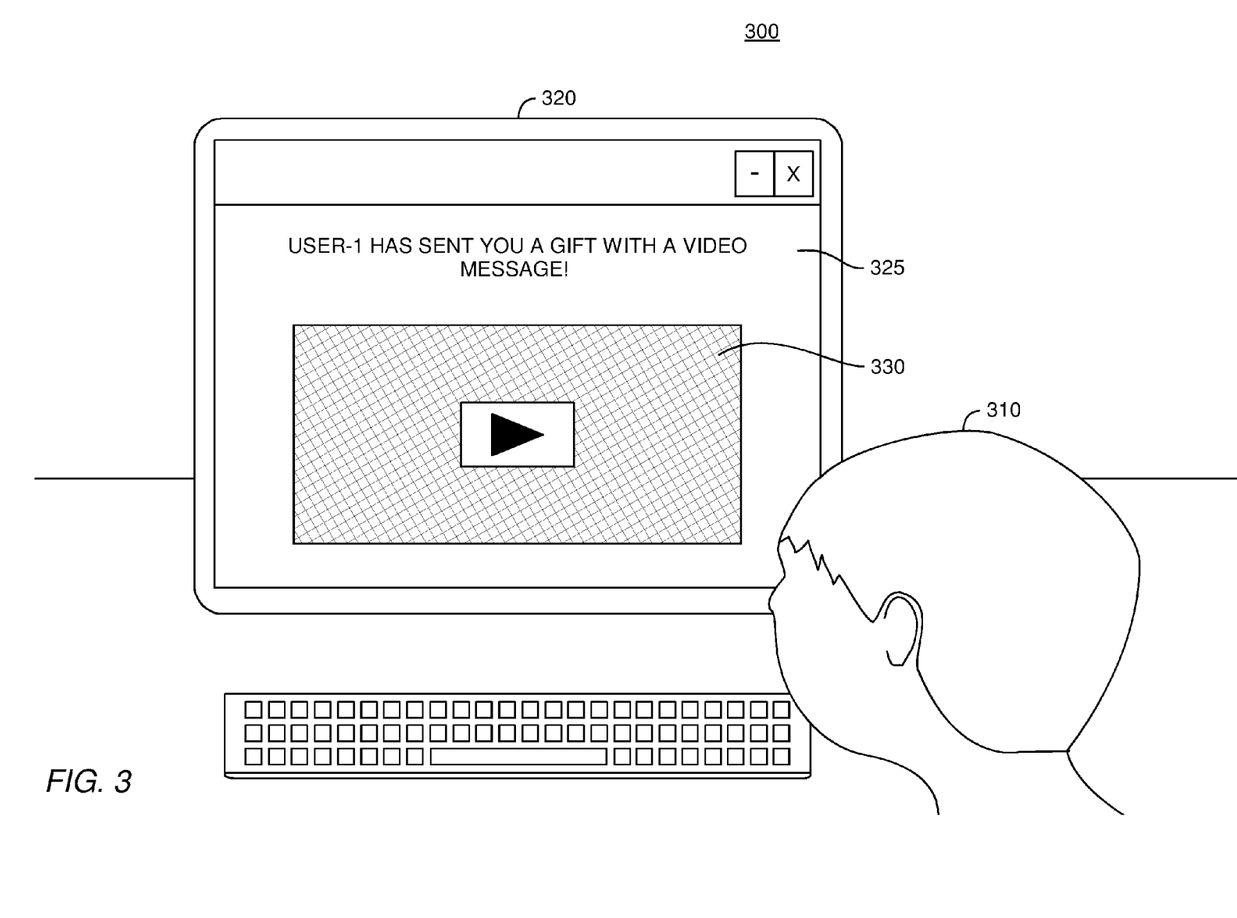
FIG. 3 depicts a user receiving a notification of a video message, according to one embodiment described herein.

Once the purchaser 210 finishes recording the video message, the VCD component 125 may deliver the video message to the recipient. An example of this is shown in FIG. 3, which depicts a user receiving a notification of a video message, according to one embodiment described herein. As shown, the recipient 310 is viewing a graphical interface 325 on a recipient system 320. Here, the interface 325 includes a message indicating that "USER-1" (i.e., the purchaser 210) has sent a gift to the recipient 310 which includes a video message, and includes a video element 330 that the recipient 310 can interact with to view the video message. As discussed above, the VCD component 125 may deliver the video message in a variety of different ways. For instance, the VCD component 125 could transmit an electronic message to the recipient 310 that includes a link to the interface 325. As another example, the VCD component 125 could include a link to the interface 325 on a memory device in the delivery packaging for the ordered goods.

Additionally, the VCD component 125 could also require the recipient 310 to enter a passphrase before viewing the video message. Such a passphrase could be used to restrict access to the video message to only the recipient 310. Additionally, such a passphrase could be used to ensure that the recipient 310 does not view the message before the gifted goods are delivered, so as to avoid spoiling the surprise of the gift for the recipient 310. For instance, the VCD component 125 could transmit a link to the interface 325 to the recipient 310 shortly after the purchaser 210 places the order, but could only provide the passphrase to the recipient 310 when the goods are delivered. Advantageously, doing so ensures that the recipient 310 cannot view the video message and learn about the contents of the gift before the gift is delivered.

Figure 4:
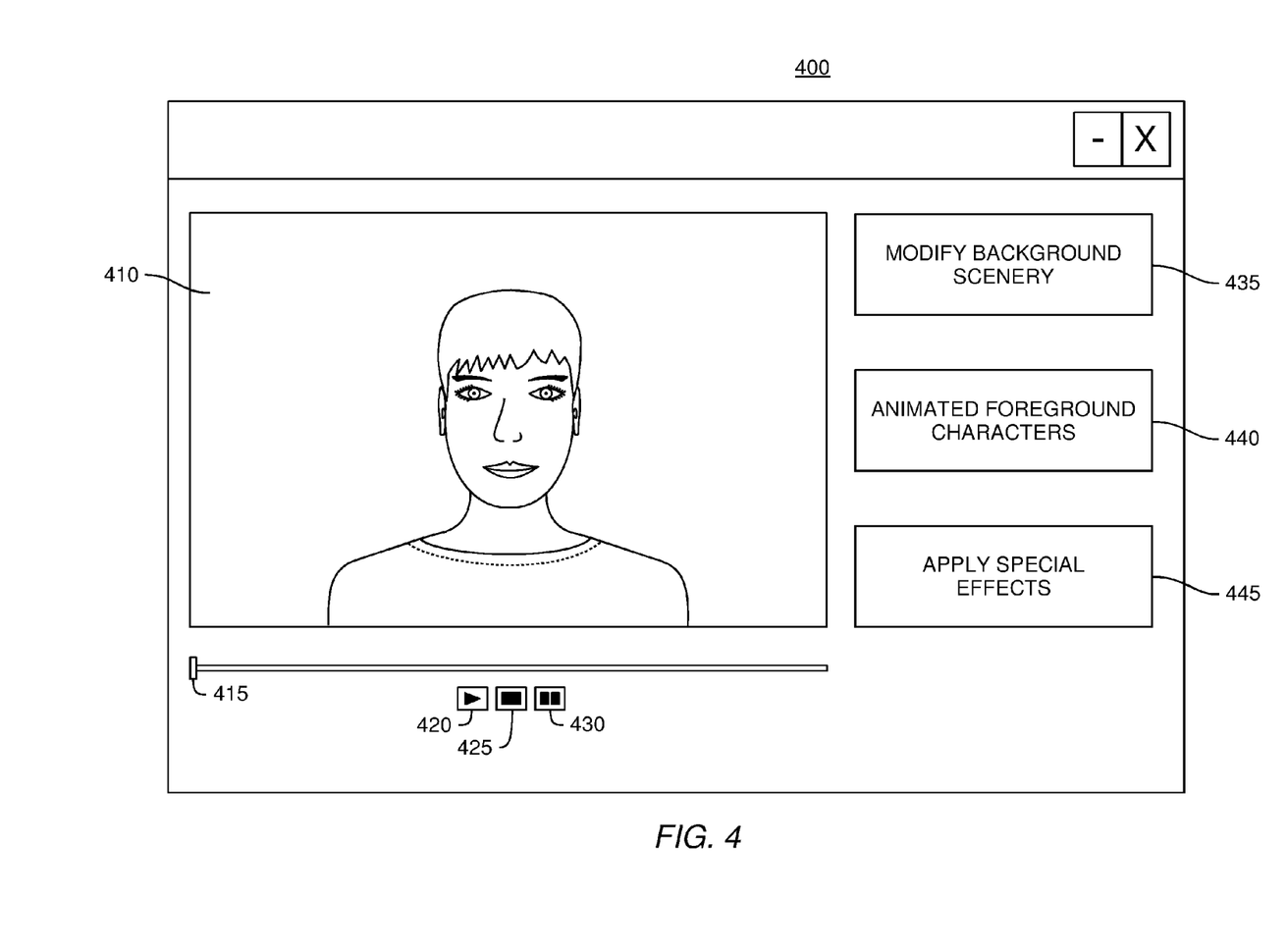
FIG. 4 depicts an interface for editing a video captured using a video capture and delivery component, according to one embodiment described herein.

Once the purchaser 210 records (or uploads) a video message, the VCD component 125 could provide an interface through which the purchaser 210 can edit the recorded (or uploaded) video message. An example of this is shown in FIG. 4, which depicts an interface for editing a video captured using a video capture and delivery component, according to one embodiment described herein. Here, the interface 400 includes a video playback element 410 where the video message can be viewed and a current position indicator 415 which depicts the current playback position in the video message. Additionally, the interface 400 includes a play button 420, a stop button 425 and a pause button 430 for controlling the playback of the video message in the video playback element 410.

Additionally, the interface 400 includes a modify background scenery button 435. For instance, the VCD component 125 could be configured with a number of predefined background scenes that a user can apply to a video message. As an example, when the user interacts with the modify background scenery button 435, the VCD component 125 could present an interface in which the user can select a particular background scene (e.g., from a plurality of different background scenes) and the VCD component 125 could apply the selected background scenery to the recorded (or uploaded) video message. For instance, the user could select a background scene of the Grand Canyon and the VCD component 125 could alter the background of the video message based on the selected background scene, so that it appears the user is at the Grand Canyon in the video message.

The interface 400 also includes an animated foreground characters button 440. Upon the user selecting the animated foreground characters button 440, the VCD component 125 could be configured to present an interface to the user in which the user can select a particular character (e.g., from a plurality of different animated characters) to insert into the video message. In one embodiment, the interface also allows the user to select a position with the video message at which the animated character should be inserted. The VCD component 125 could then insert the animated character into the video message. For example, a user could select a Mickey Mouse® animated character and the VCD component 125 could then inserted an animation of Mickey Mouse® standing next to the user in the video message.

Additionally, the interface 400 includes an apply special effects button 445. As discussed above, the VCD component 125 may be configured to apply visual and/or auditory special effects to video messages. For example, upon the user selecting the special effects button 445, the VCD component 125 could present an interface in which the user can select a particular auditory effect (e.g., from a plurality of different auditory effects) to apply to the user's voice in the video message. For instance, the user could select a Mickey Mouse® special effect and the VCD component 125 could alter the audio track for the video message so that the user's voice mimics the voice of Mickey Mouse®. As another example, the user could select a combination special effect that includes both visual and auditory effects. For instance, the user could select a fireworks effect, which alters the background of the video message so that it appears that fireworks are going off in the background, and also alters the audio track of the video message to include the sound of fireworks exploding in sync with the background imagery.

In one embodiment, the VCD component 125 is configured to recognize a predefined relationship between an item being purchased and one or more audiovisual effects for the recorded video message. For example, the item purchased could be a Pirates of the Caribbean® DVD, and the VCD component 125 could be preconfigured to determine one or more thematically appropriate audiovisual effects for augmenting the recorded video message. In one embodiment, some audiovisual effects are restricted and can only be used together with particular item purchases. For instance, the VCD component 125 could determine that the pirate background theme is related to the Pirates of the Caribbean® DVD purchase and could automatically alter the purchaser's video message to include a pirate background theme, such that it appears the purchaser is standing on the deck of a pirate ship in the video message, and could further augment the audio track of the video message to include ocean background sounds. Of course, in an embodiment where the VCD component 125 automatically applies a particular theme to the video message, the VCD component 125 could also provide a mechanism through which the purchaser can override the automatically applied audiovisual effect with another effect of the purchaser's choice or with no effect whatsoever.

In a particular embodiment, the VCD component 125 is configured to combine the recorded video message with the purchased item(s). For example, the item purchased could be a digital copy of the film Pirates of the Caribbean®, and the VCD component 125 could insert the recorded video message into the digital copy of the film (e.g., at the beginning of the film). Thus, for instance, when the recipient plays the digital item, the playback could begin with a personalized video message from the purchaser and could then turn to the film. As another example, where the digital item is a video game, the personalized video message could be packaged with the game, such that the video message is played the first time the recipient plays the game. Advantageously, doing so provides a personalized copy of a digital item, which may in turn improve the experiences of both the purchaser and the recipient.

Figure 5:
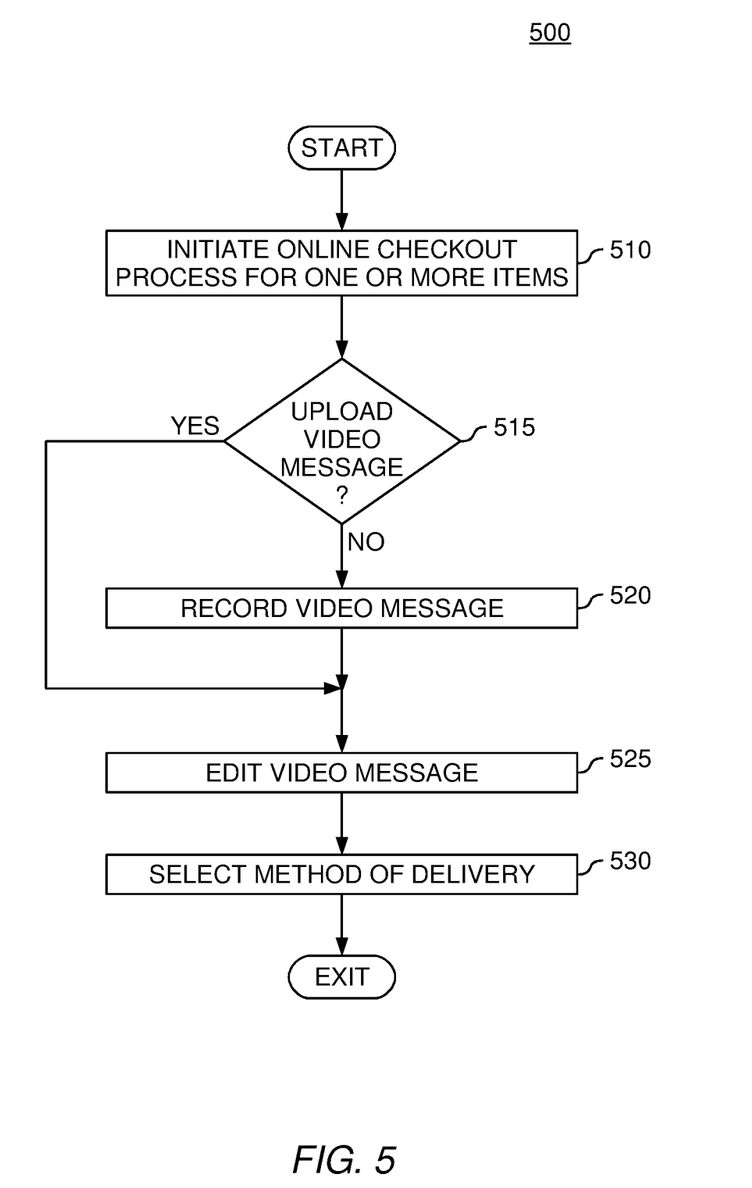
FIG. 5 is a flow diagram illustrating a method for delivering a video message associated with an online gift purchase, according to one embodiment described herein.

FIG. 5 is a flow diagram illustrating a method for delivering a video message associated with an online gift purchase, according to one embodiment described herein. As shown, the method 500 begins at block 510, where a purchaser initiates a checkout process for an online gift purchase of one or more items at an online store configured with a VCD component 125. Generally, the purchaser may specify a recipient for the online gift purchase before or during the checkout process. For example, the recipient could input the recipient's name, mailing address, and other contact information during the checkout process. The VCD component 125 then determines whether the purchaser wishes to upload a prerecorded video message (block 515). Generally, the prerecorded video message represents any video file the user wishes to be delivered to the recipient along with the gifted items. For example, the purchaser could record a home video using a handheld video camera and could upload the recorded home video to the online store during the checkout process.

If the VCD component 125 determines the user does not wish to upload a video message, the VCD component 125 presents an interface through which the purchaser can record a new video message (block 520). For instance, the VCD component 125 could provide an interface configured to interact with a web cam on the purchaser's computer system and could use the web cam to record the new video message. Once the video message is recorded or once the user uploads a pre-recorded video message, the VCD component 125 then presents an interface through which the purchaser can edit the video message (block 525). As discussed above, such edits could include, without limitation, alterations to the background scenery or audio track of the video message, the insertion of animated characters into the video message, and so on.

Once the user finishes editing the video message, the VCD component 125 selects a method for delivering the edited video message to the recipient (block 530). In one embodiment, the VCD component 125 automatically selects a delivery message through which the video message is delivered. In another embodiment, the VCD component 125 provides an interface through which the purchaser can select one (or multiple) delivery techniques for the video message. As discussed above, examples of delivery techniques include the transmission of an electronic message (e.g., an email message) including the video message or a link to the video message, a physical object (e.g., a printed piece of paper) included in the delivery packaging with the gifted objects that specifies a link to the video message (e.g., a URL at which the video message can be accessed) and the inclusion of a memory device containing the video message or a link to the video message (e.g., a URL). Additionally, as part of the delivery method, the VCD component 125 may require users to enter a passphrase or other identification information before accessing the video message. Such a passphrase may be transmitted to the recipient via an electronic message and/or a physical message (e.g., a printed piece of paper in the delivery packaging). As another example, the VCD component 125 could require the recipient to enter other identification information, such as the recipient's name and home phone number, before the recipient can view the video message. Once the method(s) of delivery is selected, the method 500 ends.

Figure 6:
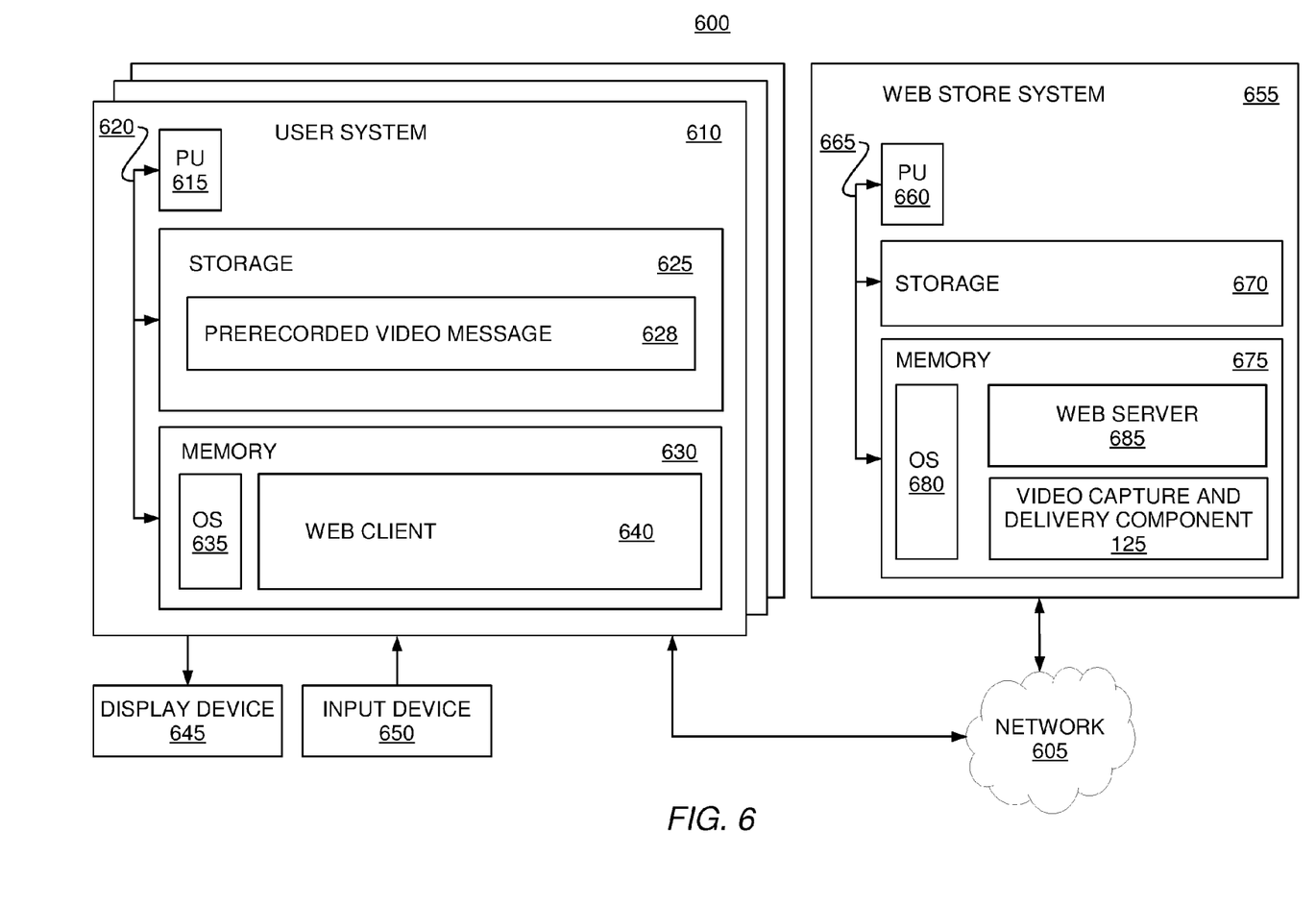
FIG. 6 is a block diagram illustrating a system configured with a video capture and delivery component, according to one embodiment described herein.

FIG. 6 is a block diagram illustrating a system configured with a video capture and delivery component, according to one embodiment described herein. As shown, the system 600 includes a plurality of user systems 610 connected to a web store system 665 via a network 605. In this example, the user systems 610 include, without limitation, a processor 615, storage 625, and memory 630, interconnected via a bus 620. Generally, the processor 615 retrieves and executes programming instructions stored in the memory 630. Processor 615 is included to be representative of a single CPU, multiple CPUs, a single CPU having multiple processing cores, GPUs having multiple execution paths, and the like. The memory 630 is generally included to be representative of a random access memory. The user system 610 may also include a network interface that enables the user system 610 to connect to the data communications network 605 (e.g., wired Ethernet connection or an 802.11 wireless network). Further, while the depicted embodiment illustrates the components of a user system 610, one of ordinary skill in the art will recognize that the user systems 610 may use a variety of different hardware architectures. Moreover, it is explicitly contemplated that embodiments of the invention may be implemented using any device or computer system capable of performing the functions described herein.

The memory 630 represents any memory sufficiently large to hold the necessary programs and data structures. Memory 630 could be one or a combination of memory devices, including Random Access Memory, nonvolatile or backup memory (e.g., programmable or Flash memories, read-only memories, etc.). In addition, memory 630 and storage 625 may be considered to include memory physically located elsewhere; for example, on another computer communicatively coupled to the user system 610. Illustratively, the memory 630 includes an operating system 635 and a web client component 640. The operating system 635 generally controls the execution of application programs on the user system 610. Examples of operating system 635 include UNIX, a version of the Microsoft Windows® operating system, and distributions of the Linux® operating system. Additional examples of operating system 635 include custom operating systems for gaming consoles, including the custom operating systems for systems such as the Nintendo DS® and Sony PSP®. Generally, the web client component 640 represents a client application configured to connect to the web server component 685 on the web store server system 655. Examples of such a web client component 640 include, without limitation, a game client and a web browser.

The depicted user system 610 is coupled to a display device 645 and an input device 650. The input device 640 could represent a variety of different input devices, such as a keyboard, a mouse, and a touch screen. Likewise, the display device 645 could be any device capable of displaying an interface for the web client component 640 (e.g., a monitor, a touch screen on a portable gaming device, a television display, etc.). Additionally, the input devices 650 may include a set of buttons, switches or other physical device mechanisms for controlling the user system 610. For example, the input devices 650 could include a set of directional buttons used to control aspects of a video game played using the user system 610.

Similarly, the web server system 655 includes a processor 660, storage 670, and memory 675, interconnected via a bus 665. Generally, the processor 660 retrieves and executes programming instructions stored in the memory 675. Processor 660 is included to be representative of a single CPU, multiple CPUs, a single CPU having multiple processing cores, GPUs having multiple execution paths, and the like. The memory 675 is generally included to be representative of a random access memory. The web store server system 655 may also include a network interface that enables the server system 655 to connect to the data communications network 605 (e.g., wired Ethernet connection or an 802.11 wireless network). Further, while the depicted embodiment illustrates the components of a particular web store server system 655, one of ordinary skill in the art will recognize that the server system 655 may use a variety of different hardware architectures. Moreover, it is explicitly contemplated that embodiments of the invention may be implemented using any device or computer system capable of performing the functions described herein.

The memory 675 represents any memory sufficiently large to hold the necessary programs and data structures. Memory 675 could be one or a combination of memory devices, including Random Access Memory, nonvolatile or backup memory (e.g., programmable or Flash memories, read-only memories, etc.). In addition, memory 675 and storage 670 may be considered to include memory physically located elsewhere; for example, on another computer communicatively coupled to the server system 655. Illustratively, the memory 675 includes an operating system 680, web server component 685 and a VCD component 125. The operating system 680 generally controls the execution of application programs on the server system 655. Examples of operating system 680 include UNIX, a version of the Microsoft Windows® operating system, and distributions of the Linux® operating system. Additional examples of operating system 680 include custom operating systems for gaming consoles, including the custom operating systems for systems such as the Nintendo DS® and Sony PSP®. Generally, the web server component 685 represents a server application configured to connect with the web client components 640 on the user system 610.

Generally, the VCD component 125 is configured to deliver a captured video message from a purchaser to a recipient of an online order. The VCD component 125 could receive an online order for one or more items and specifying a recipient. For instance, a purchaser could place the order by interacting with the web server 685 using the web client 640 on the user system 610. Such an online order may further include a request to deliver a video message from the purchaser to the recipient of the order. For example, the interface for the online store could enable the purchaser to record a video message (e.g., using an input device 650 such as a webcam) during the checkout process for the online order. As another example, the interface could enable the purchaser to upload a prerecorded video message during the checkout process.

The VCD component 125 could then receive the video message from the user system 610 and could initiate the process of fulfilling the online order for the one or more items specified in the order. For instance, in a transaction involving digital goods, the VCD component 125 could initiate a process for delivering the digital goods to the recipient, in which the recipient is notified of the online gift and allowed to download the digital goods from a server. As another example, in a transaction involving physical goods, the VCD component could initiate a process for delivering the physical goods to the recipient, in which the physical goods are packaged into a shipping container and are transported (e.g., by a freight service) to the recipient.

Additionally, the VCD component could transmit at least an indication of the video message to the recipient. For example, the VCD component could include the video message (or a reference to the video message, such as a URL) in an electronic message (e.g., an email message) transmitted to the recipient. In a transaction involving physical goods, the VCD component could initiate a process to include a URL at which the video message can be accessed in the delivery packaging for the goods. As an example, the VCD component could generate a printout (e.g., by transmitting printout data to a printer device) specifying the URL at which the video message can be accessed. Advantageously, doing so improves the online gift purchasing experience from the web store hosted on the web server 685, by creating a more personalized gift-giving experiences for both the purchasers and recipients.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user could access an online store configured with a VCD component 125 and hosted in a cloud. For example, a user could place an order specifying a recipient from the online store hosted in the cloud and the VCD component 125 could capture a personalized video message from the user. The VCD component 125 could then fulfill the online and could transmit at least an indication of the personalized video message to the recipient. Doing so allows a user to access the online store to purchase gifts together with a personalized video message from any device or computer system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving a request to deliver a personalized video message from a requester to a recipient of one or more items, together with the one or more items, wherein the personalized video message comprises a digitally represented sequence of frames;
   receiving the personalized video message from the requester, the video message being distinct from the one or more items;
   determining, without user intervention, one or more digital video augmentations pertaining to a theme of a first one of the one or more items, wherein the one or more digital video augmentations include at least one of (i) inserting an image corresponding to the first item into a background of at least one of the digitally represented sequence of frames and (ii) inserting an animated character corresponding to the first item into each of two or more frames of the digitally represented sequence of frames;
   augmenting the personalized video message by applying the determined one or more digital video augmentations to the digitally represented sequence of frames of the personalized video message to generate a modified video message; and
   transmitting at least an indication of the modified video message to the recipient in a manner that conveys an association with the one or more items.

2. The method of claim 1, further comprising:
   providing an interface through which the requester can capture the video message using one or more cameras on a computing device associated with the requester.

3. The method of claim 1, further comprising:
   providing an interface through which the requester can upload a pre-captured video message.

4. The method of claim 1, further comprising:
   associating a first access key with the video message;
   providing an interface for providing access to the video message;
   receiving a second access key as a result of the recipient interacting with the interface; and
   upon determining that the first access key matches the second access key, providing the recipient with access to the video message.

5. The method of claim 4, further comprising:
   transmitting an electronic message to a recipient address associated with the recipient, wherein the electronic message specifies the first access key.

6. The method of claim 1, wherein the one or more items are digital items and wherein transmitting at least an indication of the video message to the recipient in a manner that conveys an association with the one or more items further comprises:
providing the recipient with access to the one or more digital items.

7. The method of claim 1, wherein the modified video message is generated without requiring any user input specifying the one or more digital video augmentations to apply to the digitally represented sequence of frames of the personalized video message.

8. The method of claim 1, wherein determining, without user intervention, the one or more digital video augmentations pertaining to the theme of the first one of the one or more items further comprises:
determining a first theme corresponding to the first item;
determining a second theme corresponding to the one or more digital video augmentations; and
determining that the one or more digital video augmentations are thematically associated with the first item by determining that the first and second themes are related themes.

9. The method of claim 1, the determined one or more digital video augmentations are restricted to a set of items pertaining to the theme and inclusive of the first item, such that the determined one or more digital video augmentations are only applied to items in the set of items.

10. The method of claim 1, wherein the determined one or more digital video augmentations are exclusive to a set of items pertaining to the theme and inclusive of the first item, such that the determined one or more digital video augmentations are only applied to items in the set of items, wherein the one or more digital video augmentations are not applicable to a given item not in the set of items.

11. A system, comprising:
a processor; and
a memory containing a program that, when executed by the processor, performs an operation comprising:
receiving a request to deliver a personalized video message from a requester to a recipient of one or more items, together with the one or more items, wherein the personalized video message comprises a digitally represented sequence of frames;
receiving the personalized video message from the requester, the video message being distinct from the one or more items;
determining, without user intervention, one or more digital video augmentations pertaining to a theme of a first one of the one or more items, wherein the one or more digital video augmentations include at least one of (i) inserting an image corresponding to the first item into a background of at least one of the digitally represented sequence of frames and (ii) inserting an animated character corresponding to the first item into each of two or more frames of the digitally represented sequence of frames;
augmenting the personalized video message by applying the determined one or more digital video augmentations to the digitally represented sequence of frames of the personalized video message to generate a modified video message; and
transmitting at least an indication of the modified video message to the recipient in a manner that conveys an association with the one or more items.

12. The system of claim 11, the operation further comprising:
providing an interface through which the requester can capture the video message using one or more cameras on a computing device associated with the requester.

13. The system of claim 11, the operation further comprising:
providing an interface through which the requester can upload a pre-captured video message.

14. The system of claim 11, the operation further comprising:
associating a first access key with the video message;
providing an interface for providing access to the video message;
receiving a second access key as a result of the recipient interacting with the interface; and
upon determining that the first access key matches the second access key, providing the recipient with access to the video message.

15. The system of claim 14, the operation further comprising:
transmitting an electronic message to a recipient address associated with the recipient, wherein the electronic message specifies the first access key.

16. The system of claim 11, wherein the one or more items are digital items and wherein transmitting at least an indication of the video message to the recipient in a manner that conveys an association with the one or more items further comprises:
providing the recipient with access to the one or more digital items.

17. The system of claim 11, wherein the modified video message is generated without requiring any user input specifying the one or more digital video augmentations to apply to the digitally represented sequence of frames of the personalized video message.

18. The system of claim 11, wherein determining, without user intervention, the one or more digital video augmentations pertaining to the theme of the first one of the one or more items further comprises:
determining a first theme corresponding to the first item;
determining a second theme corresponding to the one or more digital video augmentations; and
determining that the one or more digital video augmentations are thematically associated with the first item by determining that the first and second themes are related themes.

19. The system of claim 11, the determined one or more digital video augmentations are restricted to a set of items pertaining to the theme and inclusive of the first item, such that the determined one or more digital video augmentations are only applied to items in the set of items.

20. The system of claim 11, wherein the determined one or more digital video augmentations are exclusive to a set of items pertaining to the theme and inclusive of the first item, such that the determined one or more digital video augmentations are only applied to items in the set of items, wherein the one or more digital video augmentations are not applicable to a given item not in the set of items.

21. A non-transitory computer-readable medium containing a program that, when executed, performs an operation comprising:
receiving a request to deliver a personalized video message from a requester to a recipient of one or more items, together with the one or more items, wherein the personalized video message comprises a digitally represented sequence of frames;
receiving the personalized video message from the requester, the video message being distinct from the one or more items;
determining, without user intervention, one or more digital video augmentations pertaining to a theme of a first one of the one or more items, wherein the one or more digital video augmentations include at least one of (i) inserting an image corresponding to the first item into a background of at least one of the digitally represented sequence of frames and (ii) inserting an animated character corresponding to the first item into each of two or more frames of the digitally represented sequence of frames;

augmenting the personalized video message by applying the determined one or more digital video augmentations to the digitally represented sequence of frames of the personalized video message to generate a modified video message; and transmitting at least an indication of the modified video message to the recipient in a manner that conveys an association with the one or more items.

22. The non-transitory computer-readable medium of claim 21, the operation further comprising:
providing an interface through which the requester can capture the video message using one or more cameras on a computing device associated with the requester.

23. The non-transitory computer-readable medium of claim 21, the operation further comprising:
providing an interface through which the requester can upload a pre-captured video message.

24. The non-transitory computer-readable medium of claim 21, the operation further comprising:
associating a first access key with the video message;
providing an interface for providing access to the video message;
receiving a second access key as a result of the recipient interacting with the interface; and
upon determining that the first access key matches the second access key, providing the recipient with access to the video message.

25. The non-transitory computer-readable medium of claim 24, the operation further comprising:
transmitting an electronic message to a recipient address associated with the recipient, wherein the electronic message specifies the first access key.

26. The non-transitory computer-readable medium of claim 21, wherein the one or more items are digital items and wherein transmitting at least an indication of the video message to the recipient in a manner that conveys an association with the one or more items further comprises:
providing the recipient with access to the one or more digital items.

27. The non-transitory computer-readable medium of claim 21, wherein the modified video message is generated without requiring any user input specifying the one or more digital video augmentations to apply to the digitally represented sequence of frames of the personalized video message.

28. The non-transitory computer-readable medium of claim 21, wherein determining, without user intervention, the one or more digital video augmentations pertaining to the theme of the first one of the one or more items further comprises:
determining a first theme corresponding to the first item;
determining a second theme corresponding to the one or more digital video augmentations; and
determining that the one or more digital video augmentations are thematically associated with the first item by determining that the first and second themes are related themes.

29. The non-transitory computer-readable medium of claim 21, the determined one or more digital video augmentations are restricted to a set of items pertaining to the theme and inclusive of the first item, such that the determined one or more digital video augmentations are only applied to items in the set of items.

30. The non-transitory computer-readable medium of claim 21, wherein the determined one or more digital video augmentations are exclusive to a set of items pertaining to the theme and inclusive of the first item, such that the determined one or more digital video augmentations are only applied to items in the set of items, wherein the one or more digital video augmentations are not applicable to a given item not in the set of items.

* * * * *